United States Patent [19]

Nakamura et al.

[11] Patent Number: 6,046,256
[45] Date of Patent: Apr. 4, 2000

[54] AQUEOUS DISPERSION COMPOSITION

[75] Inventors: Tetsuhisa Nakamura; Teruo Shiono; Masami Yamada; Sanji Harada; Masahiro Ihara; Takeshi Tsuyama, all of Tokyo, Japan

[73] Assignee: Toyo Ink Manufacturing Co., Ltd., Japan

[21] Appl. No.: 09/051,434

[22] PCT Filed: Aug. 12, 1996

[86] PCT No.: PCT/JP96/02283

§ 371 Date: Apr. 9, 1998

§ 102(e) Date: Apr. 9, 1998

[87] PCT Pub. No.: WO98/06782

PCT Pub. Date: Feb. 19, 1998

[51] Int. Cl.$^7$ .................................................. C08K 3/20
[52] U.S. Cl. ................................................... 523/404
[58] Field of Search .............................................. 523/404

[56] References Cited

U.S. PATENT DOCUMENTS

| | | | |
|---|---|---|---|
| 4,285,847 | 8/1981 | Ting | 523/423 |
| 4,308,185 | 12/1981 | Evans | 523/423 |
| 4,458,040 | 7/1984 | Suzuki | 523/412 |
| 4,579,888 | 4/1986 | Kodama | 523/412 |
| 5,712,339 | 1/1998 | Guerin | 524/501 |

FOREIGN PATENT DOCUMENTS

| | | |
|---|---|---|
| 6-136317 | 5/1994 | Japan . |
| 6-145593 | 5/1994 | Japan . |
| 6-179851 | 6/1994 | Japan . |
| 6-287508 | 10/1994 | Japan . |
| 7-268064 | 10/1995 | Japan . |

*Primary Examiner*—Paul R. Michl
*Attorney, Agent, or Firm*—Wenderoth, Lind & Ponack, L.L.P.

[57] ABSTRACT

A water-based dispersion composition obtained by partially or wholly neutralizing a mixture of a modified epoxy resin (A) as an emulsifying resin and an aromatic epoxy resin (B) having a number average molecular weight of 1,000 to 30,000 as a resin to be emulsified, with ammonia and/or an amine, the modified epoxy resin (A) being a modified epoxy resin obtained by reacting an aromatic epoxy resin (a1) having an epoxy equivalent of 2,000 to 20,000 with an acrylic resin (a2) having an acid value of 50 to 450 and containing acrylic acid and/or methacrylic acid, the water-based dispersion composition is applied to an internal surface of a metal can particularly required to have high processability and corrosion resistance by coating it directly on a metal material or coating it on an undercoating, baking it and drying it.

4 Claims, No Drawings

AQUEOUS DISPERSION COMPOSITION

This a national stage application of International Application No. PCT/JP96/02283, filed Aug. 12, 1996.

TECHNICAL FIELD

The present invention relates to a water-based dispersion composition. Specifically, it relates to a water-based dispersion composition for a metal can, which composition is applied directly to a metal substrate or applied to an undercoating composition. More specifically, it relates to a water-based dispersion composition which is applied to an internal surface of a can required to have high processability and high corrosion resistance.

TECHNICAL BACKGROUND

The internal surface of a conventional metal can is generally coated with a thin protective film of a synthetic resin for preventing contents from directly contacting and corroding a metal material such as tin, tin-free steel or aluminum.

The coating composition for coating the internal surface is generally selected from solvent-type epoxy coating compositions such as epoxy-phenol, epoxy-amino and epoxy-acryl coating compositions.

However, the above coating composition has a defect that they are poor in processability, since they are basically formed of thermosetting resins.

For the above reason, in the kind and filed of cans which are required to have processability in particular, there is no other choice but to use vinyl chloride resin-based organosol coating composition which is basically formed of a thermoplastic resin and has a defect that a large amount of an extract is caused and that it has poor resistance to flavor alteration.

Meanwhile, the use of an epoxy/aryl water-based coating composition is beginning in recent years for workability, environmental purposes or demands for safety (conversion to danger-free articles).

The following coating compositions have been so far disclosed; a water-based coating composition obtained by esterifying an epoxy resin with an acrylic resin containing a carboxyl group, neutralizing the resultant ester with a base and dispersing the ester in water (JP-B-59-37026), a water-based coating composition obtained by copolymerizing an epoxy resin having an acryloyl group with an ethylenically unsaturated monomer containing acrylic acid or methacrylic acid and dispersing the resultant copolymer in water in the same manner as that described above (JP-B-62-7213), and a water-based coating composition obtained by grafting a polymerizable monomer mixture containing a carboxyl group to an epoxy resin in the presence of a free radical generating agent and dispersing the resultant polymer in water in the same manner as that described above (JP-B-63-17869).

The above coating compositions are self-emulsifiable epoxy resin water-based coating composition of which the resin itself exhibits dispersibility, and they do not contain any surfactant for dispersing them in water. The above coating compositions are therefore excellent in chemical performance and water resistance.

All of the above self-emulsifiable epoxy resin water-based coating compositions contain an epoxy resin which is modified with an acrylic resin, and there is a defect that they do not easily exhibit the performances inherent to the epoxy resin, such as adhesion to an undercoating, corrosion resistance and processability. In particular, an epoxy resin having a high molecular weight does not easily undergo self-emulsification, and there is a defect that the high processability thereof is impaired.

It is an object of the present invention to provide a water-based coating composition which overcomes various problems of the above conventional vinyl chloride resin-based organosol coating composition and self-emulsifiable epoxy resin water-based coating composition and which is excellent particularly in processability and corrosion resistance.

DISCLOSURE OF THE INVENTION

The present invention 1 is directed to a water-based dispersion composition obtained by partially or wholly neutralizing a mixture of a modified epoxy resin (A) as an emulsifying resin and an aromatic epoxy resin (B) having a number average molecular weight of 1,000 to 30,000 as a resin to be emulsified, with ammonia and/or an amine, the modified epoxy resin (A) being a modified epoxy resin obtained by reacting an aromatic epoxy resin (a1) having an epoxy equivalent of 2,000 to 20,000 with an acrylic resin (a2) having an acid value of 50 to 450 and containing acrylic acid and/or methacrylic acid.

The present invention 2 is directed to a water-based dispersion composition containing a modified epoxy resin (A) as an emulsifying resin, an aromatic epoxy resin (B) having a number average molecular weight of 1,000 to 30,000 as a resin to be emulsified and a resol-type phenolic resin (C) and/or a water-based aminoplast resin (D) as a resin or resins to be emulsified, which water-based dispersion composition is obtained by partially or wholly neutralizing a mixture of the modified epoxy resin (A) with the aromatic epoxy resin (B) with ammonia and/or an amine and then adding the resol-type phenolic resin (C) or the water-based aminoplast resin (D), or by mixing all of (A) to (D) to form a mixture and then partially or wholly neutralizing the mixture, the modified epoxy resin (A) being a modified epoxy resin obtained by reacting an aromatic epoxy resin (a1) having an epoxy equivalent of 2,000 to 20,000 with an acrylic resin (a2) having an acid value of 50 to 450 and containing acrylic acid and/or methacrylic acid.

The present invention 3 is directed to a water-based dispersion composition recited as the present invention 1, in which 20 to 80% by weight of the modified epoxy resin (A) and 20 to 80% by weight of the aromatic epoxy resin (B) are used.

The present invention 4 is directed to a water-based dispersion composition recited as the present invention 2, in which 20 to 80% by weight of the modified epoxy resin (A), 20 to 80% by weight of the aromatic epoxy resin (B) and 0.2 to 20% by weight of the resol-type phenolic resin (C) or the water-based aminoplast resin (D) are used.

Further, the present invention 5 is directed to a water-based dispersion composition recited as any one of the present invention 1 to the present invention 4, wherein each of the aromatic epoxy resins (a1) and (B) is at least one selected from the group consisting of a bisphenol A type epoxy resin, a bisphenol F type epoxy resin and a mixture of a bisphenol A type epoxy resin with a bisphenol F type epoxy resin.

PREFERRED EMBODIMENTS FOR WORKING THE INVENTION

The water-based dispersion composition of the present invention is 1) a composition containing a modified epoxy resin (A) and an aromatic epoxy resin (B) or 2) a composition containing a modified epoxy resin (A), an aromatic epoxy resin (B) and a resol-type phenolic resin (C) and/or a water-based aminoplast resin (D). For obtaining the above water-based dispersion compositions, there are three methods, 1-1) one method in which a modified epoxy resin (A) and an aromatic epoxy resin (B) are mixed and the mixture is neutralized to form a water-based dispersion by adding ammonia and/or an amine, 2-1) another method in which a modified epoxy resin (A) and an aromatic epoxy resin (B) are mixed, the mixture is neutralized to form a water-based dispersion by adding ammonia and/or an amine and then a resol-type phenolic resin (C) and/or a water-based aminoplast resin (D) are or is added, and 2-2) another method in which all the components such as a modified epoxy resin (A), an aromatic epoxy resin (B) and a resol-type phenolic resin (C) and/or a water-based aminoplst resin (D) and the like are mixed and ammonia and/or an amine are or is added to form a water-based dispersion.

In the present invention, preferably, the mixture of a modified epoxy resin (A) and an aromatic epoxy resin (B) is heated at 60 to 120° C. for 0.5 to 5 hours, and in this case, the compatibility between the modified epoxy resin (A) and the aromatic epoxy resin (B) is improved and the composition is improved in processability and corrosion resistance.

The water-based dispersion composition of the present invention is excellent in processability since it contains an aromatic epoxy resin (B) which has not reacted with an acrylic resin. Further, it has an increased crosslinking density by containing a resol type phenolic resin (C) and/or a water-based aminoplast resin (D) as a curing component, and it is therefore improved in corrosion resistance.

The modified epoxy resin (A) is obtained by reacting an aromatic epoxy resin (a1) having an epoxy equivalent of 2,000 to 20,000 and an acrylic resin (a2) having an acid value of 50 to 450 and containing acrylic acid and/or methacrylic acid, which will be described later. The modified epoxy resin (A) is an emulsifying resin having the function as an emulsifier to disperse the aromatic epoxy resin (B), the resol type phenolic resin (C), the water-based aminoplast resin (D), and the like.

When the epoxy equivalent of the aromatic epoxy resin (a1) is less than 2,000, the reaction with the acrylic resin (a2) having an acid value of 50 to 450 and containing acrylic resin and/or methacrylic resin tends to proceed too far, to cause an increase in viscosity. When the above epoxy equivalent exceeds 20,000, the reaction with the acrylic resin (a2) does not proceed, and in the water-based dispersion composition, the modified epoxy resin (A) shows poor dispersion stability with the aromatic epoxy resin (B), the resol type phenolic resin (C), the water-based aminoplast resin (C), etc. The epoxy equivalent is therefore 2,000 to 20,000, preferably 4,000 to 15,000 in view of processability.

The aromatic epoxy resin (a1) having an epoxy equivalent of 2,000 to 20,000 includes a bisphenol A type epoxy resin, a bisphenol F type epoxy resin, a bisphenol B type epoxy resin, a bisphenol E type epoxy resin, copolymer epoxy resins of these and mixtures of the above epoxy resins. At least one of the above resins is selected. As commercially available products, there are "Epikote 1007", "Epikote 1009", "Epikote 1010", "Epikote 4009" and "Epikote 4010" supplied by Shell International Chemicals Corp., and "YDF2004", "ZX-1356", "ZX-1344" and "ZX-1345" supplied by Toto Chemical Industry, Ltd.

A monomer used for the preparation of the acrylic resin (a2) which contains acrylic acid and/or methacrylic acid as an essential component and is allowed to react with the aromatic epoxy resin compound (a1) is a monomer which is copolymerizable with acrylic acid and/or methacrylic acid. Examples thereof include one or at least two of carboxyl group-containing vinyl monomers such as crotonic acid, itaconic acid, maleic acid and fumaric acid; styrene monomers such as styrene, vinyltoluene, 2-methylstyrene, t-butylstyrene and chlorostyrene; (meth)acrylate ester monomers such as methyl (meth) acrylate, ethyl (meth) acrylate, n-propyl (meth)acrylate, isopropyl (meth)acrylate, n-butyl (meth) acrylate, isobutyl (meth) acrylate, n-amyl (meth)acrylate, isoamyl (meth)acrylate, hexyl (meth) acrylate, n-2ethylhexyl (meth)acrylate, n-octyl (meth) acrylate, decyl (meth)acrylate, dodecyl (meth)acrylate and lauryl (meth)acrylate; hydroxyl group-containing monomers such as 2-hydroxyethyl (meth) acrylate, hydroxypropyl (meth)acrylate and hydroxymethyl (meth)acrylate; and N-substituted (meth)acryl monomers such as N-methylol (meth)acrylamide and N-butyoxymethyl(meth)acrylamide.

The (meth)acrylate ester monomers stand for acrylate ester monomers and/or methacrylate ester monomers, the hydroxyethyl (meth)acrylate stands for hydroxyethyl acrylate and/or hydroxyethyl methacrylate, and the N-substituted (meth)acryl monomers stand for N-substituted acryl monomers and/or N-substituted methacryl monomers.

A polymerization catalyst for the above ethylenically unsaturated monomer mixture can be selected, for example, from an organic peroxide, a persulfate, an azobis compound and a redox system which is a combination of any one of these with a reducing agent.

Specific examples thereof include benzoyl peroxide, perbutyl octate, t-butyl hydroperoxide, azobisisobutyronitirle, azobisvaleronitrile and 2,2-azobis (2-aminopropane) hydrochloride. In particular, benzoyl peroxide and azobisisobutyronitrile are preferred. These can be used in an amount of 0.3 to 15 parts by weight per 100 parts by weight of the reaction components.

The acrylic resin (a2) containing acrylic acid and/or methacrylic acid as an essential component, used in the present invention, is not specially limited concerning constitutional ratio and kind, while the amount of the acrylic acid and/or methacrylic acid is preferably at least 5% by weight, particularly preferably 25 to 70% by weight.

The amount of the vinyl monomer copolymerizable with the acrylic acid and/or methacrylic acid is preferably 95% by weight or less, particularly preferably 30 to 75% by weight, and styrene and ethyl acrylate are preferred.

The acryl resin (a2) containing the acrylic acid and/or methacrylic acid as an essential component, used in the present invention, has an acid value of 50 to 450, and the acid value is preferably 150 to 400.

When the acid value is less than 50, the reaction does not proceed and the dispersibility in water is poor. When the acid value exceeds 450, the water resistance is poor.

The number average molecular weight of the acryl resin (a2) is preferably 2,000 to 100,000, more preferably 5,000 to 50,000.

The modified epoxy resin (A) is preferably a resin obtained by reacting 20 to 90% by weight of the above aromatic epoxy resin (a1) with 10 to 80% by weight of the acryl resin (a2) having an acid value of 50 to 450 and containing acrylic acid and/or methacrylic acid.

When the amount of the aromatic epoxy resin (a1) is less than 20% by weight, the processability is poor. When it exceeds 90% by weight, the dispersibility with the aromatic epoxy resin (B), the resol type phenolic resin (C) and the water-based aminoplast resin (D) is poor. It is therefore preferably 20 to 90% by weight, more preferably 30 to 80% by weight.

Further, the reaction of the aromatic epoxy resin (a1) with the acrylic resin (a2) containing acrylic acid and/or methacrylic acid as an essential component in the present invention is preferably carried out in a hydrophilic organic solvent at 60 to 170° C. for 10 minutes to 5 hours, and ammonia and an amine may be used as a reaction catalyst.

The hydrophilic organic solvent in the the reaction of the aromatic epoxy resin (a1) with the acrylic resin (a2) containing acrylic acid and/or methacrylic acid as an essential component is preferably a solvent which dissolves the aromatic epoxy resin (a1) and the acrylic resin and is easily mixed with water.

For example, it includes alcohol, glycol, diglyocl and acetate solvents.

Specifically, it includes n-propanol, isopropanol, n-butyl alcohol, isobutyl alcohol, n-amyl alcohol, amyl alcohol, methyl amyl alcohol, ethylene glycol, diethylene glycol, 1,3-butylene glycol, ethylene glycol monoethyl ether, ethylene glycol monobutyl ether, diethylene glycol monoethyl ether, diethylene glycol monobutyl ether, methylpropylene glycol, methylpropylene diglycol, propylpropylene glycol, propylpropylene diglycol, butylpropylene glycol, ethylene glycol monomethyl ether acetate, ethylene glycol monoethyl ether acetate, propylene glycol monomethyl ether acetate, 3-methoxybutyl acetate, ethylene glycol monobutyl ether acetate, 3-methyl-3-methoxybutyl acetate, etc.

Other solvent may be used, while a solvent which can be removed during or after the water-based dispersion composition is produced is preferred.

The aromatic epoxy resin (B) is selected from those having a number average molecular weight of 1,000 to 30,000, and preferably, the number average molecular weight is 3,000 to 20,000.

Of those, preferred are a bisphenol A type epoxy resin, a bisphenol F type epoxy resin, a bisphenol B type epoxy resin, a bisphenol E type epoxy resin or copolymer epoxy resins of these, or mixtures of the above epoxy resins. A mixture of at least two of these may be used.

As commercially available products, there are "Epikote 1007", "Epikote 1009", "Epikote 1010", "Epikote 4009" and "Epikote 4010" supplied by Shell International Chemicals Corp., "Phenoxy PKHH" supplied by Phenoxy Associate K.K., and "YDF2004", "ZX-1356", "YP-50S", "ZX-1344", "ZX-1345" and "ZX-1356" supplied by Toto Chemical Industry, Ltd.

In both cases when the resol type phenolic resin (C) and the water-based aminoplast resin (D) are used and when they are not used, it is preferred to use 20 to 80% by weight of the modified epoxy resin (A) obtained as described above and 20 to 80% by weight of the aromatic epoxy resin (B).

When the amount of the modified epoxy resin (A) is less than 20% by weight, it is difficult to emulsify and disperse the aromatic epoxy resin (B). When it exceeds 80% by weight, the content of the aromatic epoxy resin (B) is relatively small, and as a result, the processability and the corrosion resistance decrease. The amount of the modified epoxy resin (A) is therefore preferably 20 to 80% by weight, more preferably 20 to 70% by weight, particularly preferably 30 to 60% by weight.

In both cases when the resol type phenolic resin (C) and the water-based aminoplast resin (D) are used and when they are not used, the amount of the aromatic epoxy resin (B) is preferably at least 20% by weight. When it is less than 20% by weight, the reactivity is poor and the crosslinking density is low, and as a result, the corrosion resistance decreases. On the other hand, when it exceeds 80% by weight, the content of the modified epoxy resin (A) as an emulsifying component is relatively small, and the dispersion stability in water decreases.

Therefore, the amount of the aromatic epoxy resin (B) is preferably 20 to 80% by weight, more preferably 20 to 70% by weight, particularly preferably 30 to 60% by weight.

In the present invention, it is preferred to use the resol type phenolic resin (C) and/or the aminoplast resin (D) since the crosslinking density increases so that the corrosion resistance improves. However, even when one of these is used and even when (C) and (D) are used in combination, the amount thereof is preferably less than 20% by weight, more preferably 0.2 to 15% by weight, since the crosslinking density is too high and the processability tends to decrease when the above amount in (A)+(B)+((C)+(D))=100% by weight exceeds 20% by weight.

The resol type phenolic resin (C) used in the present invention includes a resin obtained by condensing any phenol component and formaldehyde in the presence of a basic catalyst.

Further, the phenol component for constituting the resol type phenolic resin includes bifunctional phenols such as o-cresol, p-cresol, p-tert-butylphenol, p-ethylphenol, 2,3-xylenol, 2,5-xylenol, p-tert-aminophenol, p-nonylphenol, p-phenylphenol and p-cyclohexylphenol, trifunctional phenols such as carbolic acid, m-cresol, m-ethylphenol, 3,5-xylenol and m-methoxyphenol, monofunctional phenols such as 2,4-xylenol and 2,6-xylenol and tetrafunctional phenols such as bisphenol A: bisphenol B and bisphenol F. One of these or a combination of at least two of these is used.

The basic catalyst is selected, for example, from ammonia, an amine, hydroxide of an alkaline earth metal, oxide of an alkali metal and oxide of an alkaline earth metal.

The water-based aminoplast resin (D) used in the present invention is any one of products obtained by addition-condensing any amino component and formaldehyde in the presence of a basic catalyst and alkyl-etherifying the reaction product with an alcohol or not alkyl-etherifying the reaction product with an alcohol.

The amino component includes melamine, benzoguanamine, acetoguanamine, urea, spyroguanamine and phthaloguanamine, and one of these or a combination of at least two of these is used.

The alcohol includes methanol, ethanol, isobutanol and n butanol, and one of these or a combination of at least two of these is used.

It is preferably a melamine or benzoguanamine resin which is etherified with methanol or ethanol. As commercially available products, there are Cymel 300, 303, 325, 701, 1123, 1170 and My Coat 101 supplied by Mitsui Cyteck.

Examples of the ammonia or the amine used in the present invention include alkylamines such as trimethylamine, triethylamine and butylamine, alcohol amines such as dimethylaminoethanol, diethanolamine and aminopropanol, and volatile amine such as morpholine.

The water-based dispersion composition of the present invention may contain a solvent, a surfactant and an antifoamer for improving its coating properties, as required.

Further, the water-based dispersion composition of the present invention may contain a wax as a lubricant for the purpose of preventing a scratch at the time of processing and transportation after a coating is formed.

As a substrate to which it is applied, a treated or non-treated plate such as an aluminum plate, a steel plate, a zinc steel plate, a tin plate or the like is suitable. The water-based dispersion of the present invention may be coated on a primer such as an epoxy- or vinyl-containing primer, or may be coated directly on a metal material.

The application method can be selected from various known methods such as roll coating, spray coating, dipping and electrodeposition, and above all, roll coating and spray coating are preferred.

The curing conditions are preferably 1 to 30 minutes at 150 to 210° C., or 15 seconds to 60 seconds at 220 to 300° C.

EXAMPLES

The present invention will be more specifically explained with reference to Examples hereinafter. In Examples, "part" and "%" stand for "part by weight" and "% by weight", respectively.

Preparation Example 1

Preparation of acrylic resin (A1) solution

| | | |
|---|---|---|
| (1) Styrene | 105.0 | parts |
| (2) Ethyl acrylate | 105.0 | parts |
| (3) Methacrylic acid | 90.0 | parts |
| (4) Benzoyl peroxide | 3.0 | parts |
| (5) n Butanol | 696.4 | parts |
| (6) Benzoyl peroxide | 0.3 | part |
| (7) Benzoyl peroxide | 0.3 | part |

The above (5) was charged into a four-necked flask and heated to 105° C. under a nitrogen gas current, and a mixture solution of (1) to (4) was dropwise added at 100° C. over 3 hours. One hour after the addition, (6) was added, and further, one hour thereafter, (7) was added. The mixture was maintained at the said temperature for 1 hour to give an acrylic resin (A1) having a solid content of 30%, an acid value of 196 and a number average molecular weight of 12,000.

Preparation Example 2

Preparation of acrylic resin (A2) solution

| | | |
|---|---|---|
| (1) Styrene | 75.0 | parts |
| (2) Ethyl acrylate | 75.0 | parts |
| (3) Methacrylic acid | 150.0 | parts |
| (4) Benzoyl peroxide | 2.0 | parts |
| (5) n Butanol | 696.4 | parts |
| (6) Benzoyl peroxide | 0.2 | part |
| (7) Benzoyl peroxide | 0.2 | part |

The above components were allowed to react in the same manner as in Preparation Example 1, to give an acrylic resin (A2) having a solid content of 30%, an acid value of 326 and a number average molecular weight of 15,000.

Preparation Example 3

Preparation of epoxy resin (B1) solution

| | | |
|---|---|---|
| (1) Epikote 1007 (supplied by Yuka-Shell Epoxy K.K.) | 400.0 | parts |
| (2) Ethylene glycol monobutyl ether | 300.0 | parts |
| (3) Methyl ethyl ketone | 300.0 | parts |

The above (1) and (2) were charged into a four-necked flask and dissolved under heat 110° C. under a nitrogen gas current, to give an epoxy resin (B1) solution having a solid content of 40%, an epoxy equivalent of 2,000 and a number average molecular weight of 2,000.

Preparation Example 4

Preparation of epoxy resin (B2) solution

| | | |
|---|---|---|
| (1) Epikote 1010 (supplied by Yuka-Shell Epoxy K.K.) | 400.0 | parts |
| (2) Ethylene glycol monobutyl ether | 300.0 | parts |
| (3) Methyl ethyl ketone | 300.0 | parts |

An epoxy resin was dissolved in the same manner as in Preparation Example 3 to give an epoxy resin (B2) solution having a solid content of 40%, an epoxy equivalent of 4,100 and a number average molecular weight of 8,100.

Preparation Example 5

Preparation of epoxy resin (B3) solution

| | | |
|---|---|---|
| (1) Epikote 4010 (supplied by Yuka-Shell Epoxy K.K.) | 400.0 | parts |
| (2) Ethylene glycol monobutyl ether | 300.0 | parts |
| (3) Methyl ethyl ketone | 300.0 | parts |

An epoxy resin was dissolved in the same manner as in Preparation Example 3 to give an epoxy resin (B3) solution having a solid content of 40%, an epoxy equivalent of 4,000 and a number average molecular weight of 8,000.

Preparation Example 6

Preparation of epoxy resin (B4) solution

| | | |
|---|---|---|
| (1) Epikote 828EL (supplied by Yuka-Shell Epoxy K.K.) | 254.2 | parts |
| (2) Bisphenol A | 145.8 | parts |
| (3) Sodium methylate (methanol 28% solution) | 0.08 | part |
| (4) Diethylene glycol monobutyl ether | 200.0 | parts |
| (5) Ethylene glycol monobutyl ether | 100.0 | parts |
| (6) Methyl ethyl ketone | 300.0 | parts |

(1) to (3) were charged into a four-necked flask and gradually heated under a nitrogen gas current to allow them to react at 160° C. As soon as a viscosity started to increase, (4) was added little by little and the mixture was allowed to react until an epoxy equivalent of 8,500 was found. Then, (5) and (6) were added to give an epoxy resin (B4) solution having a solid content of 40% and a number average molecular weight of 12,000.

Preparation Example 7

Preparation of epoxy resin (B5) solution

| | | |
|---|---|---|
| (1) Epikote 828EL (supplied by Yuka-Shell Epoxy K.K.) | 249.9 | parts |
| (2) Bisphenol A | 150.1 | parts |
| (3) Sodium methylate (methanol 28% solution) | 0.08 | part |
| (4) Diethylene glycol monobutyl ether | 200.0 | parts |
| (5) Ethylene glycol monobutyl ether | 100.0 | parts |
| (6) Methyl ethyl ketone | 300.0 | parts |

The above components were allowed to react in the same manner as in Preparation Example 4, to give an epoxy resin (B5) solution having a solid content of 40% and a number average molecular weight of 10,000.

Preparation Example 8

Preparation of epoxy resin (B6) solution

| | |
|---|---|
| (1) Epikote 828EL (supplied by Yuka-Shell Epoxy K.K.) | 244.3 parts |
| (2) Bisphenol B | 155.7 parts |
| (3) Tetraethylammonium iodide | 0.2 part |
| (4) Tetraethylammonium iodide | 0.2 part |
| (5) Tetraethylammonium iodide | 0.2 part |
| (6) Propylene glycol momomethyl ether acetate | 200.0 parts |
| (7) Propylene glycol momomethyl ether acetate | 100.0 parts |
| (8) Methyl ethyl ketone | 300.0 parts |

(1) to (3) were charged into a four-necked flask and gradually heated under a nitrogen gas current to allow them to react at 150° C. (4) and (5) were added every 2 hours, and as soon as aviscosity increased, (6) was added little by little and the mixture was allowed to react until an epoxy equivalent of 9,000 was found. Then, (7) and (8) were added to give an epoxy resin (B6) solution having a solid content of 40% and a number average molecular weight of 10,000.

Preparation Example 9

Preparation of epoxy resin (B7) solution

| | |
|---|---|
| (1) Epikote 828EL (supplied by Yuka-Shell Epoxy K.K.) | 255.6 parts |
| (2) Bisphenol E | 144.4 parts |
| (3) Tetraethylammonium iodide | 0.2 part |
| (4) Tetraethylammonium iodide | 0.2 part |
| (5) Tetraethylammonium iodide | 0.2 part |
| (6) Propylene glycol momomethyl ether acetate | 200.0 parts |
| (7) Propylene glycol momomethyl ether acetate | 100.0 parts |
| (8) Methyl ethyl ketone | 300.0 parts |

The above components were allowed to react in the same manner as in Preparation Example 8, and the reaction was carried out until an epoxy equivalent of 9,000 was found. Then, (7) and (8) were added to give an epoxy resin (B7) solution having a solid content of 40% and a number average molecular weight of 10,000.

Preparation Example 10 le;.5qPreparation of epoxy resin (B8) solution

| | |
|---|---|
| (1) Phenoxy PKHH (supplied by Phenoxy Associates K.K.) | 400.0 parts |
| (2) Ethylene glycol monobutyl ether | 300.0 parts |
| (3) Methyl ethyl ketone | 300.0 parts |

An epoxy resin was dissolved in the same manner as in Preparation Example 3, to give an epoxy resin (B8) solution having a solid content of 40%, an epoxy equivalent of 55,000 and a number average molecular weight of 12,000.

Preparation Example 11

Preparation of epoxy resin (B9) solution

| | |
|---|---|
| (1) ZX-1346 (supplied by Toto Chemical Industry Ltd.) | 400.0 parts |
| (2) Ethylene glycol monobutyl ether | 300.0 parts |
| (3) Methyl ethyl ketone | 300.0 parts |

An epoxy resin was dissolved in the same manner as in Preparation Example 3, to give an epoxy resin (B9) solution having a solid content of 40%, an epoxy equivalent of 27,700 and a number average molecular weight of 13,500.

Preparation Example 12

Preparation of resol type phenolic resin (C) solution

| | |
|---|---|
| (1) p-Cresol | 417.7 parts |
| (2) Formalin 40% - n-butanol solution | 580.1 parts |
| (3) Magnesium hydroxide | 2.2 parts |

(1) to (3) were charged into a four-necked flask and allowed to react under a nitrogen gas current at 100° C. for 2.5 hours. Then, the reaction mixture was neutralized with phosphoric acid, and xylene/n-butanol/cyclohexanone=1/1/1 and a large amount of water were added. The mixture was allowed to stand for 5 hours, and an aqueous layer containing a formed salt was separated and removed, and the residue was azeotropically dehydrated to give a resol type phenolic resin (C) solution having a solid content of about 35%.

Preparation Example 13

Preparation of water-based aminoplast resin (D) solution

| | |
|---|---|
| (1) Cymel 1123 | 350.0 parts |
| (2) Ethylene glycol monoethyl ether | 650.0 parts |

(1) and (2) were charged into a four-necked flask and dissolved under a nitrogen gas current at 30° C. to give a water-based aminoplast resin (D) solution having a solid content of about 35%.

Example 1

| | |
|---|---|
| (1) Acrylic resin (A1) solution | 125.0 parts |
| (2) Epoxy resin (B1) solution | 218.8 parts |
| (3) Dimethylaminoethanol | 1.8 parts |
| (4) Epoxy resin (B4) solution | 250.0 parts |
| (5) Dimethylaminoethanol | 7.0 parts |
| (6) Deionized water | 1,000.0 parts |
| (7) Resol type phenolic resin (C) solution | 71.4 parts |
| (8) Ethylene glycol monobutyl ether | 80.0 parts |
| (9) Deionized water | 200.0 parts |

(1) to (3) were charged into a four-necked flask and allowed to react under heat at 110° C. for 3 hours, and then (4) was added. Further, (5) was added, the mixture was fully stirred, and (6) was gradually added. Further, (7) was added, and the solvent was withdrawn together with water under reduced pressure at 50 to 60° C. (8) was added, and the solid content was adjusted with (9) to give a water-based dispersion composition having a solvent content of 8% and a solid content of 25%.

Examples 2–22

In the same manner as in Example 1, acrylic resin (A1) and (A2) solutions and epoxy resin (B1) to (B7) solutions were charged in resin mixing ratios shown in Tables 1 and 2 and allowed to react, further, epoxy resin (B2) to (B9) solutions were charged, then, at least one selected from resol type phenolic resin (C) solution or water-based aminoplast resin (D) solution was charged, and a solvent content and a solid content were adjusted with ethylene glycol monobutyl ether and deionized water, to give water-based dispersion compositions having a solvent content of 8% and a solid content of 25%.

Example 23

| | |
|---|---:|
| (1) Acrylic resin (A1) solution | 125.0 parts |
| (2) Epoxy resin (B1) solution | 218.8 parts |
| (3) Dimethylaminoethanol | 1.8 parts |
| (4) Epoxy resin (B8) solution | 250.0 parts |
| (5) Resol type phenolic resin (C) solution | 71.4 parts |
| (6) Dimethylaminoethanol | 7.0 parts |
| (7) Deionized water | 1,000.0 parts |
| (8) Ethylene glycol monobutyl ether | 80.0 parts |
| (9) Deionized water | 200.0 parts |

(1) to (3) were charged into a four-necked flask and allowed to react under heat at 110° C. for 3 hours, and then (4) and (5) were added. Further, (6) was added, the mixture was fully stirred, and (7) was gradually added. The solvent was withdrawn together with water under reduced pressure at 50 to 60° C. (8) was added, and the solid content was adjusted with (9) to give a water-based dispersion composition having a solvent content of 8% and a solid content of 25%

Example 24

| | |
|---|---:|
| (1) Acrylic resin (A1) solution | 125.0 parts |
| (2) Epoxy resin (B1) solution | 218.8 parts |
| (3) Dimethylaminoethanol | 1.8 parts |
| (4) Epoxy resin (B8) solution | 250.0 parts |
| (5) Dimethylaminoethanol | 7.0 parts |
| (6) Deionized water | 1,000.0 parts |
| (7) Resol type phenolic resin (C) solution | 71.4 parts |
| (8) Ethylene glycol monobutyl ether | 80.0 parts |
| (9) Deionized water | 200.0 parts |

(1) to (3) were charged into a four-necked flask and allowed to react under heat at 110° C. for 3 hours, and then (4) was added. The mixture was heated at 80° C. for 1 hour. Further, (5) was added, and the mixture was fully stirred. Then, (6) was gradually added, and then (7) was added. The solvent was withdrawn together with water under reduced pressure at 50 to 60° C. (8) was added, and the solid content was adjusted with (9) to give a water-based dispersion composition having a solvent content of 8% and a solid content of 25%.

TABLE 1

| | | Example (solid content wt. %) | | | | | |
|---|---|---|---|---|---|---|---|
| | | 1 | 2 | 3 | 4 | 5 | 6 |
| Modified Epoxy Resin (A) | Acrylic resin (A1) solution | 15 | | | | | |
| | Acrylic resin (A2) solution | | 15 | 15 | 15 | 15 | 15 |
| | Epoxy resin (B1) solution | 35 | | | | | |
| | Epoxy resin (B2) solution | | 35 | | | 35 | |
| | Epoxy resin (B3) solution | | | 35 | | | |

TABLE 1-continued

| | | | | | | | |
|---|---|---|---|---|---|---|---|
| | Epoxy resin (B4) solution | | | | 35 | | |
| | Epoxy resin (B5) solution | | | | | | 35 |
| Aromatic Epoxy Resin (B) | Epoxy resin (B2) solution | | | | | | 40 |
| | Epoxy resin (B5) solution | | | | | 40 | |
| | Epoxy resin (B8) solution | 40 | 40 | 40 | 40 | 40 | |
| | Epoxy resin (B9) solution | | | | | | |
| Resol type phenolic resin (C) solution | | 10 | 10 | 10 | 10 | 10 | 10 |
| Water-based aminoplast resin (D) solution | | | | | | | |

| | | Example (solid content wt. %) | | | | | |
|---|---|---|---|---|---|---|---|
| | | 7 | 8 | 9 | 10 | 11 | 12 |
| Modified Epoxy Resin (A) | Acrylic resin (A1) solution | | | | | 20 | |
| | Acrylic resin (A2) solution | 15 | 15 | 15 | 10 | | 15 |
| | Epoxy resin (B1) solution | | | | | | |
| | Epoxy resin (B2) solution | 35 | 35 | 35 | 40 | 40 | |
| | Epoxy resin (B3) solution | | | | | | |
| | Epoxy resin (B4) solution | | | | | | 35 |
| | Epoxy resin (B5) solution | | | | | | |
| Aromatic Epoxy Resin (B) | Epoxy resin (B2) solution | | | | | | |
| | Epoxy resin (B5) solution | 40 | | | | | |
| | Epoxy resin (B8) solution | | | 40 | 40 | 30 | 45 |
| | Epoxy resin (B9) solution | | 40 | | | | |
| Resol type phenolic resin (C) solution | | 10 | 10 | | 10 | 10 | 5 |
| Water-based aminoplast region (D) solution | | | | 10 | | | |

TABLE 2

| | | Example (solid content wt. %) | | | | | |
|---|---|---|---|---|---|---|---|
| | | 13 | 14 | 15 | 16 | 17 | 18 |
| Modified Epoxy Resin (A) | Acrylic resin (A1) solution | | | | | | |
| | Acrylic resin (A2) solution | 14 | 15 | 15 | 10 | 15 | 15 |
| | Epoxy resin (B1) solution | | | | | | |
| | Epoxy resin (B2) solution | 25 | | | 25 | | |
| | Epoxy resin (B3) solution | | | | | | |
| | Epoxy resin (B4) solution | | 40 | 40 | | 45 | 15 |
| | Epoxy resin (B5) solution | | | | | | |
| | Epoxy resin (B6) solution | | | | | | |
| | Epoxy resin (B7) solution | | | | | | |
| Aromatic Epoxy Resin (B) | Epoxy resin (B2) solution | | | | | | 60 |
| | Epoxy resin (B5) solution | 59 | 44 | 45 | 45 | 20 | |

TABLE 2-continued

| | | | | | | |
|---|---|---|---|---|---|---|
| Epoxy resin (B6) solution | | | | | | |
| Epoxy resin (B7) solution | | | | | | |
| Epoxy resin (B8) solution | | | | | | |
| Epoxy resin (B9) solution | | | | | | |
| Resol type phenolic resin (C) solution | 2 | 1 | — | 20 | 20 | 10 |
| Water-based aminoplast region (D) solution | | | | | | |

| | | Example (solid content wt. %) | | | | | |
|---|---|---|---|---|---|---|---|
| | | 19 | 20 | 21 | 22 | 23 | 24 |
| Modified Epoxy Resin (A) | Acrylic resin (A1) solution | | | | | 15 | 15 |
| | Acrylic resin (A2) solution | 15 | 15 | 15 | 15 | | |
| | Epoxy resin (B1) solution | | | | | | |
| | Epoxy resin (B2) solution | 35 | 35 | | | | |
| | Epoxy resin (B3) solution | | | | | | |
| | Epoxy resin (B4) solution | | | | | | |
| | Epoxy resin (B5) solution | | | | | | |
| | Epoxy resin (B6) solution | | | 35 | | | |
| | Epoxy resin (B7) solution | | | | 35 | | |
| Aromatic Epoxy Resin (B) | Epoxy resin (B2) solution | | | | | | |
| | Epoxy resin (B5) solution | | | | | | |
| | Epoxy resin (B6) solution | 40 | | | | | |
| | Epoxy resin (B7) solution | | 40 | | | | |
| | Epoxy resin (B8) solution | | | 40 | 40 | 40 | 40 |
| | Epoxy resin (B9) solution | | | | | | |
| Resol type phenolic resin (C) solution | | 10 | 10 | 10 | 10 | 10 | 10 |
| Water-based aminoplast region (D) solution | | | | | | | |

Comparative Examples 1–7

Water-based dispersions having a solid content of about 25% were obtained in the same manner as in Example 1 except that the component mixing ratio was changed as shown in Table 3.

TABLE 3

| | Comparative Example (solid content wt. %) | | | | | | |
|---|---|---|---|---|---|---|---|
| | 1 | 2 | 3 | 4 | 5 | 6 | 7 |
| Acrylic resin (A1) solution | 15 | | | | | 15 | 15 |
| Acrylic resin (A2) solution | | 15 | 15 | 9.1 | | | |
| Epoxy resin (B2) solution | 75 | 75 | 65 | 5 | | 60 | 75 |
| Epoxy resin (B6) solution* | | | 10 | 81.8 | | | |
| Resol type phenolic resin (C) solution | 10 | 10 | 10 | 4.5 | 25 | | |
| Water-based aminoplast resin (D) solution | | | | | 10 | | |

Performance Test

The water-based coating compositions obtained in Examples 1 to 17 and Comparative Examples 1 to 7 were evaluated for storage stability as coating compositions, and coatings of test panels prepared under the following conditions were evaluated for various properties. Tables 4 and 5 show the results.

Conditions of test panel preparation: Applied to a 0.30 mm aluminum plate with a bar coater to form a coating having a thickness of 10μ, and the coating was baked and dried at 200° C. for 5 minutes to obtain a test panel.

Test methods shown in Tables 4 and 5 are as shown below.

(1) Storage stability of coating composition: Stored in a constant-temperature container at 50° C., and an appearance and physical properties were periodically evaluated.
Excellent storage stability . . . ◯
Failures such as gelation, precipitation, separation, etc., took place during the storage . . . X (2) Adhesion: A coating surface was cross-cut with a knife to form 11 cut lines lengthwise and widthwise each with intervals of about 1.5 mm. A 24 mm wide Cellophane tape was intimately contacted and strongly peeled off, and the number of portions which were not peeled off from the grid portion is shown in a numerator.

(3) Water resistance: Treated in water at 125° C. for 40 minutes, and a coating was evaluated for its surface state.

(4) Processability: A coated plate was cut to a size of 40 mm×50 mm, and the cut piece was folded into two with the coating outside such that a test portion was 40 mm. Two 0.30 mm aluminum plates were placed in the two-folded test piece, and a load of 3 kg was dropped on the folded portion from a height of 45 cm. Then, a sponge impregnated with a sodium chloride aqueous solution was pressed to the outer surface of the folded portion. The other side of the sponge was contacted to a metal plate as an electrode, and 6 V was applied between the metal plate and the end portion of the folded portion for 10 seconds, and after 10 seconds, an after-electric current value between the metal plate and the top portion of the folded portion was measured.

(5) Corrosion resistance: A test piece having an incision of X mark formed on its coating surface with a knife was treated in a 1% sodium chloride aqueous solution at 125° C. for 40 minutes, and stored at 50° C. for 1 week. The degree of corrosion in the vicinity of the X mark was evaluated.
No abnormality was found . . . ◯ mark
Corrosion was slightly found . . . Δ mark
Corrosion was heavily found . . . X mark (6) Resistance to flavor alteration (abbreviated as flavor):
A test piece of a coating was placed in a bottle of a heat-resistant glass which was filled with tap water treated with activated carbon such that the treated water amount was 1 ml per 1 cm² of a coated surface, and the bottle was covered and subjected to sterilization treatment at 125° C. for 45 minutes. Then, the contained water was evaluated for a flavor alteration.
No alteration . . . ◯ mark
Slightly altered . . . Δ mark
Markedly altered . . . X mark

TABLE 4

| | Storability | Adhesion | Water resistance | Processability mA | Corrosion resistance | Flavor |
|---|---|---|---|---|---|---|
| Example | | | | | | |
| 1 | ○ | 100/100 | ○ | 2.9 | ○ | ○ |
| 2 | ○ | 100/100 | ○ | 1.7 | ○ | ○ |
| 3 | ○ | 100/100 | ○ | 1.2 | ○ | ○ |
| 4 | ○ | 100/100 | ○ | 1.3 | ○ | ○ |
| 5 | ○ | 100/100 | ○ | 1.2 | ○ | ○ |
| 6 | ○ | 100/100 | ○ | 3.3 | ○ | ○ |
| 7 | ○ | 100/100 | ○ | 1.3 | ○ | ○ |
| 8 | ○ | 100/100 | ○ | 0.9 | ○ | ○ |
| 9 | ○ | 100/100 | ○ | 1.8 | ○ | ○ |
| 10 | ○ | 100/100 | ○ | 1.5 | ○ | ○ |
| 11 | ○ | 100/100 | ○ | 2.9 | ○ | ○ |
| 12 | ○ | 100/100 | ○ | 1.5 | ○ | ○ |
| 13 | ○ | 100/100 | ○ | 0.9 | ○ | ○ |
| 14 | ○ | 100/100 | ○ | 0.7 | ○ | ○ |
| 15 | ○ | 100/100 | ○ | 0.5 | ○ | ○ |
| 16 | ○ | 100/100 | ○ | 2.5 | ○ | ○ |
| 17 | ○ | 100/100 | ○ | 1.8 | ○ | ○ |
| 18 | ○ | 100/100 | ○ | 2.0 | ○ | ○ |
| 19 | ○ | 100/100 | ○ | 2.1 | ○ | ○ |
| 20 | ○ | 100/100 | ○ | 2.2 | ○ | ○ |
| 21 | ○ | 100/100 | ○ | 1.8 | ○ | ○ |
| 22 | ○ | 100/100 | ○ | 2.0 | ○ | ○ |
| 23 | ○ | 100/100 | ○ | 2.7 | ○ | ○ |
| 24 | ○ | 100/100 | ○ | 1.9 | ○ | ○ |

TABLE 5

| | Storability | Adhesion | Water resistance | Processability mA | Corrosion resistance | Flavor |
|---|---|---|---|---|---|---|
| C. Ex. | | | | | | |
| 1 | ○ | 100/100 | ○ | 15.1 | Δ | ○ |
| 2 | ○ | 100/100 | ○ | 17.3 | Δ | ○ |
| 3 | ○ | 100/100 | ○ | 14.5 | Δ | ○ |
| 4 | × | 0/100 | Δ | 1.5 | × | ○ |
| 5 | ○ | 100/100 | ○ | 20.2 | Δ | ○ |
| 6 | ○ | 100/100 | ○ | 15.9 | Δ | ○ |

CEx. = Comparative Example

Industrial Utility

The present invention is a water-based dispersion composition containing a specific modified epoxy resin and an aromatic epoxy resin (B), and can provide a cured coating excellent in processability by containing a large amount of a non-modified epoxy resin having a high molecular weight. Further, the present invention improves reactivity by the use of a crosslinked resin (resol type phenolic resin, water-based aminoplast resin) to increase a crosslinking density, so that it can give a cured coating excellent in corrosion resistance.

What is claimed is:

1. A process for the production of a water-based dispersion composition, comprising mixing 20 to 80% by weight of a modified epoxy resin (A) as an emulsifying resin and 20 to 80% by weight of an aromatic epoxy resin (B) having a number average molecular weight of 1,000 to 30,000 as a resin to be emulsified to form a mixture and partially or wholly neutralizing the mixture by adding ammonia and/or an amine, the modified epoxy resin (A) being a modified epoxy resin obtained by reacting an aromatic epoxy resin (a1) having an epoxy equivalent of 2,000 to 20,000 with an acrylic resin (a2) having an acid value of 50 to 450 and containing acrylic acid and/or methacrylic acid.

2. A process for the production of a water-based dispersion composition, comprising mixing 20 to 80% by weight of a modified epoxy resin (A) as an emulsifying resin, 20 to 80% by weight of an aromatic epoxy resin (B) having a number average molecular weight of 1,000 to 30,000 as a resin to be emulsified to form a mixture, partially or wholly neutralizing the mixture by adding ammonia and/or an amine, and then adding a resol type phenolic resin (C) and/or a water-based aminoplast resin (D), the modified epoxy resin (A) being a modified epoxy resin obtained by reacting an aromatic epoxy resin (a1) having an epoxy equivalent of 2,000 to 20,000 with an acrylic resin (a2) having an acid value of 50 to 450 and containing acrylic acid and/or methacrylic acid.

3. A process for the production of a water-based dispersion composition, comprising mixing 20 to 80% by weight of a modified epoxy resin (A) as an emulsifying resin, 20 to 80% by weight of an aromatic epoxy resin (B) having a number average molecular weight of 1,000 to 30,000 as a resin to be emulsified, a resol type phenolic resin (C) and/or a water-based anminoplast resin (D) to form a mixture and partially or wholly neutralizing the mixture by adding ammonia and/or an amine, the modified epoxy resin (A) being a modified epoxy resin obtained by reacting an aromatic epoxy resin (a1) having an epoxy equivalent of 2,000 to 20,000 with an acrylic resin (a2) having an acid value of 50 to 450 and containing acrylic acid and/or methacrylic acid.

4. A process for producing water-based dispersion composition according to claim 1, wherein the aromatic epoxy resins (a1) and (B) are at least one selected from the group consisting of bisphenol A type, bisphenol F type or a mixture of bisphenol A and bisphenol F type.

* * * * *